United States Patent
Wurzburg

(10) Patent No.: US 7,054,980 B2
(45) Date of Patent: May 30, 2006

(54) MULTIPLE DRIVE CONTROLLER

(75) Inventor: Henry Wurzburg, Austin, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 523 days.

(21) Appl. No.: 10/137,690

(22) Filed: May 2, 2002

(65) Prior Publication Data

US 2003/0208651 A1    Nov. 6, 2003

(51) Int. Cl.
*G06F 13/00*  (2006.01)
(52) U.S. Cl. .............................. 710/305; 710/8; 711/114
(58) Field of Classification Search .................... 710/4, 710/8–11, 300, 303, 305, 306; 711/114
See application file for complete search history.

(56) References Cited

U.S. PATENT DOCUMENTS

| | | | |
|---|---|---|---|
| 6,061,746 A * | 5/2000 | Stanley et al. | ................ 710/10 |
| 6,216,185 B1 | 4/2001 | Chu | |
| 6,279,059 B1 | 8/2001 | Ludtke et al. | |
| 6,461,181 B1 | 10/2002 | Goh et al. | |
| 6,779,067 B1 * | 8/2004 | Shelton et al. | .............. 710/300 |
| 6,810,432 B1 * | 10/2004 | Hanes et al. | ................... 710/4 |
| 2003/0154330 A1 * | 8/2003 | Bolt | .............................. 710/8 |

OTHER PUBLICATIONS

Kozierok, Charles M., The PC Guide (online), section SFF-8020 / ATA Packet Interface (ATAPI), 1 pp, Apr. 17, 2001 (http://www.pcguide.com/ref/hdd/if/ide/stdATAPI-c.html).*
Universal Serial Bus Specification, Revision 1.1; Sep. 23, 1998.*
Universal Serial Bus Specification, Revision 2.0., Apr. 27, 2000.*
AT Attachment Interface for Disk Drives (ATA-1), ANSI X3.22 1—199x, Working Draft☐☐Revision 4c.*
AT Attachment Interface with Extensions (ATA-2), ANSI X3.279—199x, Working Draft☐☐Revision 4c, Mar. 18, 1996.*
AT Attachment-3 Interface (ATA-3), ANSI X3.298—1997, Working Draft Revision 7b,☐☐Jan. 27, 1997.*

(Continued)

*Primary Examiner*—Rehana Perveen
*Assistant Examiner*—Clifford Knoll
(74) *Attorney, Agent, or Firm*—Meyertons Hood Kivlin Kowert & Goetzel, P.C.; Jeffrey C. Hood; Erik A. Heter

(57) ABSTRACT

A drive controller for controlling multiple disk drives is disclosed. In one embodiment, the drive controller includes a physical interface circuit configured for coupling to a peripheral bus. A plurality of serial interface engines may be coupled to the physical interface circuit. A buffer may be coupled to each of the plurality of serial interface engines and an interface controller. The interface controller may be configured for coupling to a plurality of disk drives. Since the drive controller includes only a single physical interface circuit, a single buffer, and a single interface controller, its complexity is reduced to near that of a single drive controller while being capable for simultaneously providing interfaces for each of a plurality of disk drives.

18 Claims, 5 Drawing Sheets

OTHER PUBLICATIONS

Small PCI Specification, Version 1.5a Final, Dec. 23, 1996.*
Accelerated Graphics Port Interface Specification, Revision 2.0, May 4, 1998.*

AGP Pro Specification, Revision 1.0, Aug. 1998.*
AGP Pro Specitication, Revision 1.1a, Apr. 1999.*

* cited by examiner

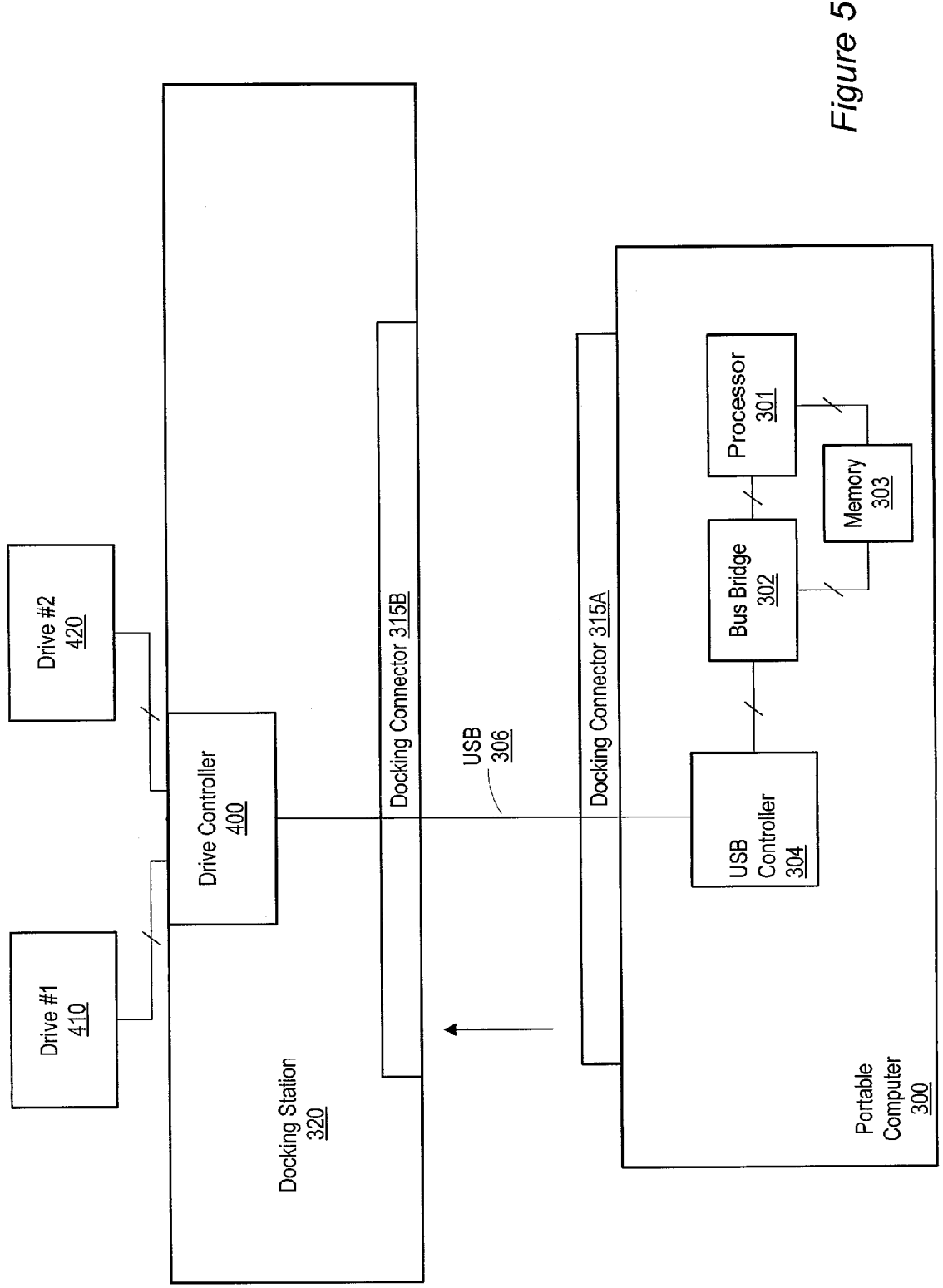

MULTIPLE DRIVE CONTROLLER

BACKGROUND OF THE INVENTION

1. Field of the Invention

This invention relates to computer systems, and more particularly, to peripheral controller devices.

2. Description of the Related Art

Computer systems often time use disk drives as input/output (I/O) devices. One embodiment of a disk drive interface for universal serial bus (USB) is shown in FIG. 1. The interface may include a physical layer, a serial engine interface (SEI), an endpoint buffering unit, and an ATA interface controller. The physical layer may couple the disk drive interface to a host controller via the USB, while the ATA interface controller may couple the interface to a disk drive.

In some cases it may be desired to couple multiple disk drives to a computer system. In order to couple multiple disk drives, it may be necessary to provide additional interfaces. FIG. 2 illustrates a block diagram of an interface configured for multiple disk drives. The interface includes a single USB hub, but includes separate physical layers, SEI's, endpoint buffering units, and ATA interface controllers for each disk drive. While this solution provides the necessary interface circuitry to support two disk drives, it may consume a significant amount of power. Furthermore, the extra circuitry may result in higher system manufacturing costs. In particular, the addition of the USB hub may result in much higher cost and power consumption.

SUMMARY OF THE INVENTION

A drive controller for controlling multiple disk drives is disclosed. In one embodiment, the drive controller includes a physical interface circuit configured for coupling to a peripheral bus. A plurality of serial interface engines may be coupled to the physical interface circuit. A buffer may be coupled to each of the plurality of serial interface engines and an interface controller. The interface controller may be configured for coupling to a plurality of disk drives. Since the drive controller includes only a single physical interface circuit, a single buffer, and a single interface controller, its complexity is reduced to near that of a single drive controller while being capable for simultaneously providing interfaces for each of a plurality of disk drives.

In one embodiment, the physical interface circuit may be coupled to a universal serial bus (USB). The physical interface circuit may include one or more drivers for driving signals onto the bus, and one or more receivers for receiving signals from the bus. The physical interface circuit may also provide any necessary protocol conversion functions that are necessary for data transmissions between the USB and a disk drive coupled to the interface controller.

A separate serial interface engine may be present for each disk drive that may be coupled to the drive controller. The serial interface engine may provide serial-to-parallel or parallel-to-serial data conversions for data being transmitted to or received from the bus.

The buffer may be a buffer memory, and may provide elasticity for data flow between the peripheral bus and one or more disk drives coupled to the disk controller. The buffer may provide temporary storage of data that is being received from the bus or is to be transmitted onto the bus. This may allow data to continue flowing in either direction even in times of heavy system traffic.

The interface controller may provide interfaces for coupling one or more disk drives, and may provide control functions for operating the drives. These control functions may include drive selections, addressing, and executing read and write commands. In various embodiment, the interface controller may be an ATA (advanced technology attachment) or ATAPI (ATA packet interface) controller.

Various types of disk drives may be coupled to the drive controller. Such drive types may include, but are not limited to, floppy disk drives, hard disk drives, CD-ROM drives, and DVD-ROM drives.

BRIEF DESCRIPTION OF THE DRAWINGS

Other aspects of the invention will become apparent upon reading the following detailed description and upon reference to the accompanying drawings in which:

FIG. 5 is a block diagram of one embodiment of a portable computer coupled to a docking station, the portable computer and docking station each including a drive controller configured for supporting multiple drives.

Figure 1:
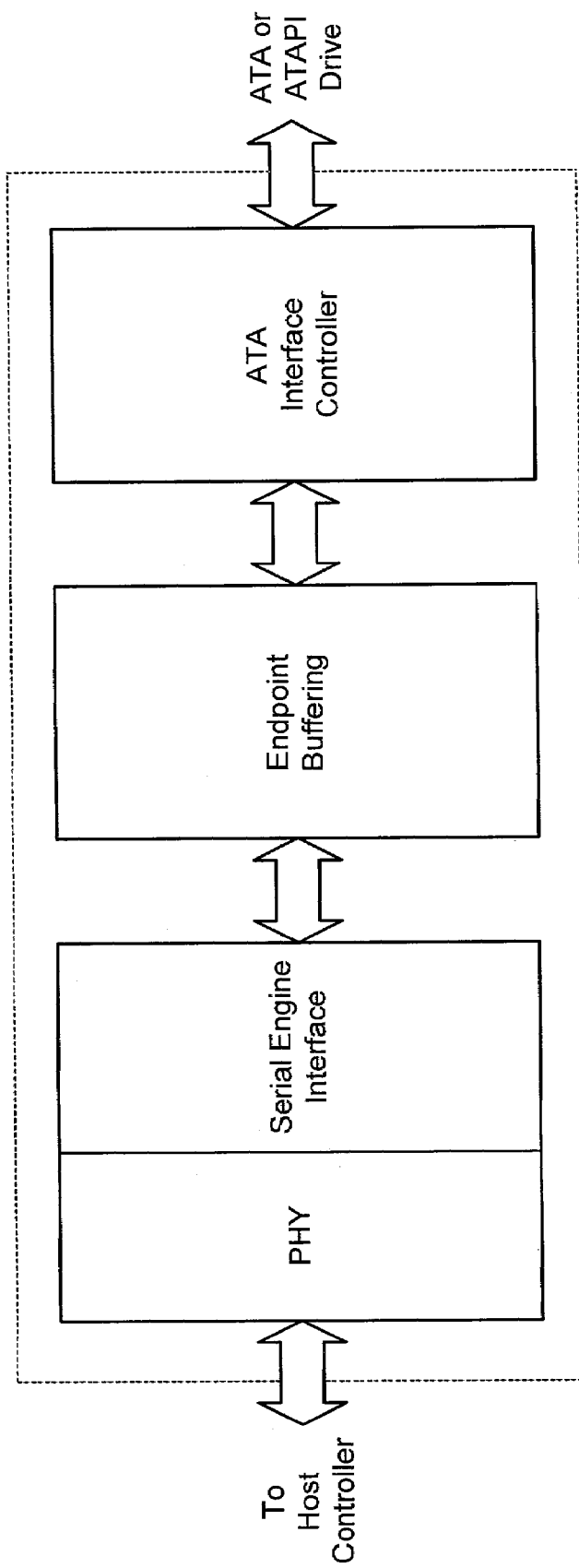
FIG. 1 (Prior Art) is a block diagram of one embodiment of a drive controller.
Figure 2:
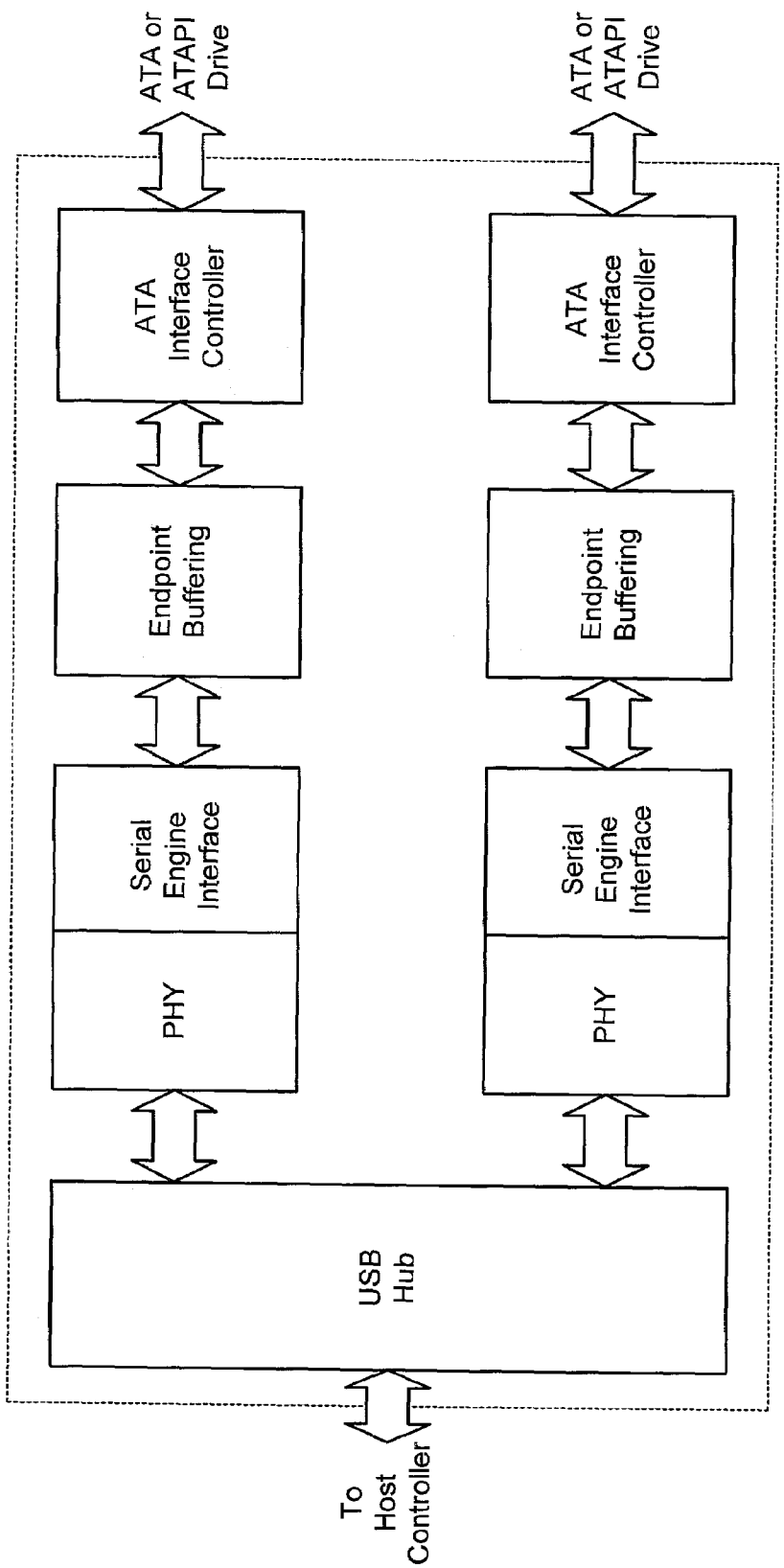
FIG. 2 (Prior Art) is a block diagram of one embodiment of a drive controller configured to support multiple drives.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Figure 3:
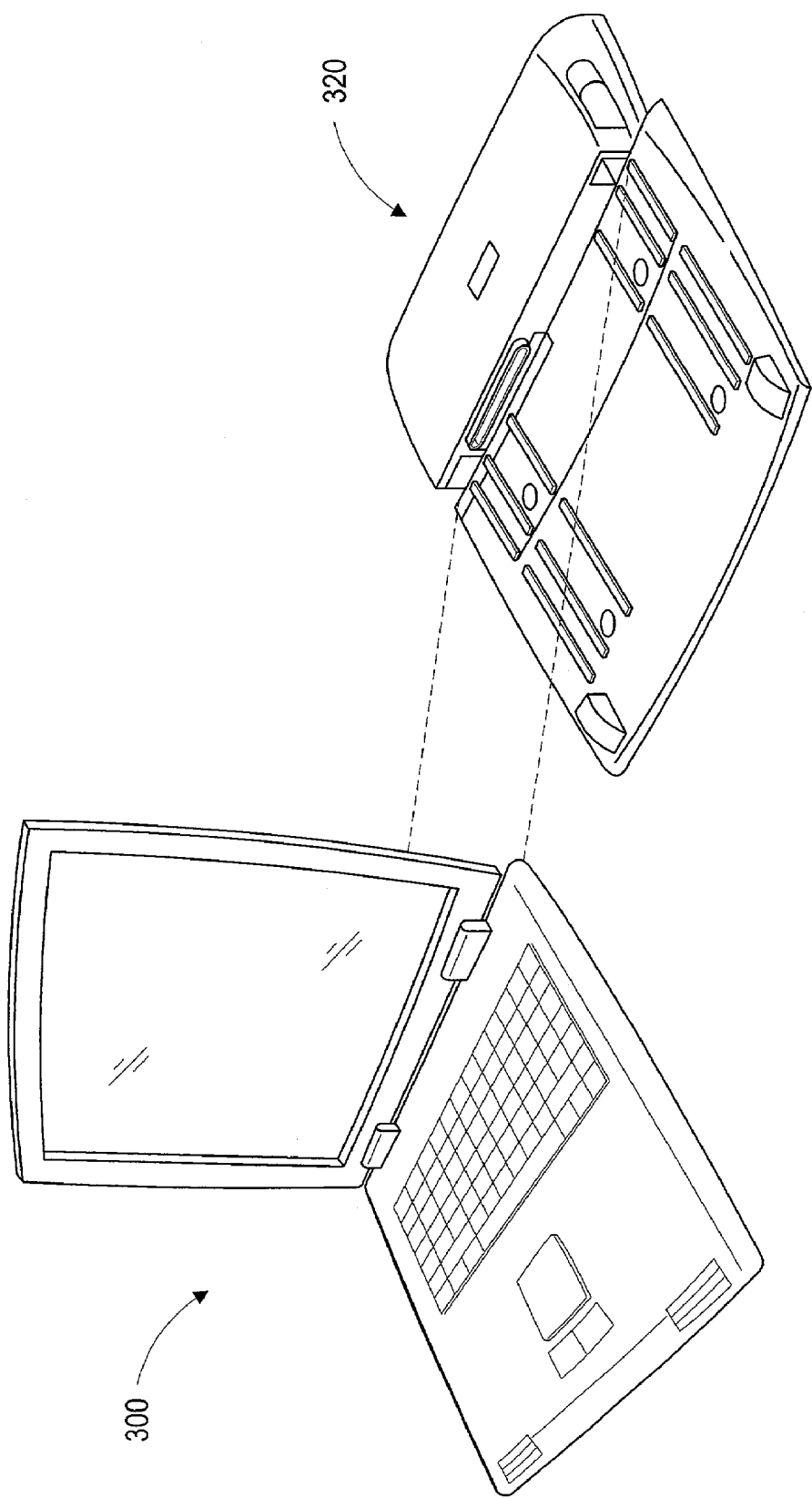
FIG. 3 is a drawing of one embodiment of a portable computer and a docking station.

FIG. 3 is a drawing of one embodiment of a portable computer and a docking station. Portable computer 300 may be one of many different types of portable computers (i.e. laptops, notebooks, etc.). Furthermore, it is possible and contemplated that portable computer 300 may be another type of device, such as a personal digital assistant (PDA).

Docking station 320 may provide additional functionality to portable computer 300. Docking station 320 may include connections for a full-size keyboard, a monitor, a printer, and various peripheral devices. Various types of peripheral device interfaces may be employed, including universal serial bus (USB), peripheral component interconnect (PCI), and so on. Although portable computer 300 may include some of these types interfaces, docking station 320 may provide additional interfaces, thereby expanding the capability of the portable computer.

In one embodiment, both portable computer 300 and docking station 320 may be configured for coupling to one or more disk drives. A drive controller enabling the coupling of multiple disk drives to portable computer 300 and/or docking station 320 will be described in further detail below. Thus, portable computer 300 may be configured to support the operation of a plurality of disk drives. Docking station

320 may also support the operation of a plurality of disk drives when coupled to portable computer 300.

Figure 4:
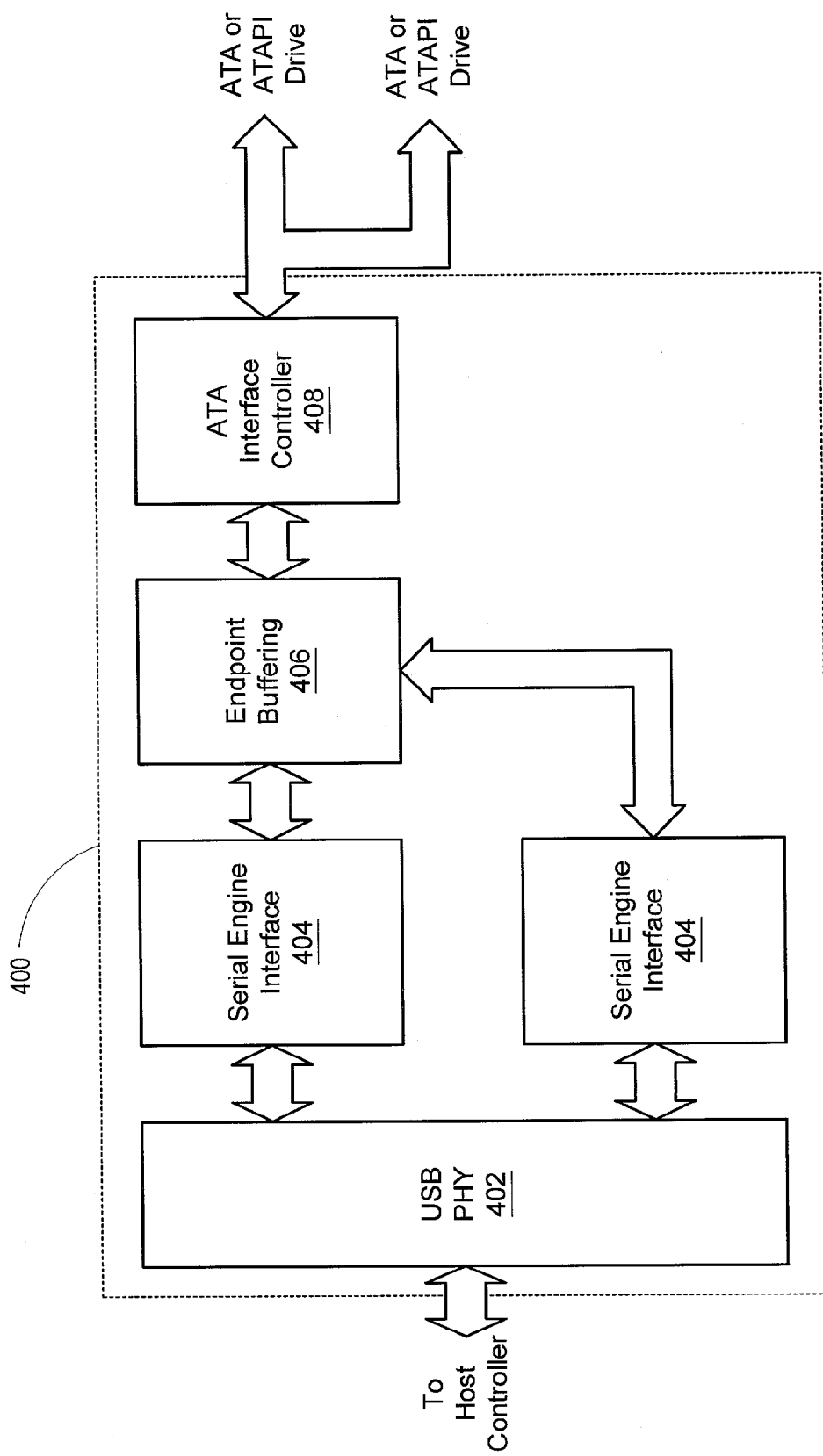
FIG. 4 is a block diagram of one embodiment of a drive controller configured to support multiple drives using a single interface controller.

Turning now to FIG. 4, a block diagram of one embodiment of a drive controller configured to support multiple drives using a single interface controller is shown. Drive controller 400 may be coupled to a peripheral bus through physical interface circuit 402. In the embodiment shown, physical interface circuit 402 is configured for coupling to a universal serial bus (USB). It should be noted however, that embodiments of drive controller 400 may be configured for coupling to other types of peripheral buses (e.g. PCI, AGP, SCSI, etc.), and physical interface circuit 402 may be configured accordingly. Physical interface circuit 402 may support the USB 1.1 standard, or the USB 2.0 standard (which encompasses the USB 1.1 standard).

Physical interface circuit 402 may be configured for driving signals onto, and receiving signals from, the USB, and may thus include both driver and receiver circuits. In addition to the driver and receiver circuits, the physical interface circuit may provide protocol conversion for data received from the bus, or data that is to be transmitted onto the USB. During transmissions of data onto the USB, physical interface circuit 402 may perform any necessary protocol conversions for data received from one of serial engines 404. The protocol conversions may format the data suitable for transmission onto the USB. Similarly, data received from the USB may undergo protocol conversions prior to being forwarded to one of serial interface engines 404.

A plurality of serial interface engines (SIEs) 404 are coupled to physical interface circuit 402. In the embodiment shown, two SIEs 404 are present, and correspond to the ability of drive controller 400 to support two disk drives. Other embodiments having the ability to support additional numbers of drives, and thus incorporating additional SIEs 404 are possible and contemplated. Each SIE 404 may provide parallel-to-serial or serial-to-parallel conversions for data being transmitted to or from physical interface circuit 402, depending on the direction of data flow. Each SIE 404 may also perform the generation of packets to be transmitted onto the USB, or the extraction of packets received from the USB.

Buffer 406 is coupled to each of the SIEs 404. Buffer 406 may provide data elasticity when data is transferred through drive controller 400 between the USB and any attached disk drives, which may send or receive data at different rates. For example, if a floppy disk coupled to drive controller 400 may receive data at a rate that is slower than data can be send over the USB. Thus, buffer 406 may provide temporary storage of data received by drive controller 400 from a USB until it can be written to a disk inserted into the floppy disk drive. Similarly, if a high-speed drive such as a CD-ROM is coupled to drive controller 400, it may be able to read data faster than data can be packetized and transmitted onto the USB, and thus buffer 406 may provide temporary storage for data flow in that direction as well. In general, the presence of buffer 406 may allow devices attached to both ends of drive controller 400 to transmit and/or receive data at their maximum possible rate.

Interface controller 408 is coupled to buffer 406. In the embodiment shown, the controller is an ATA (advanced technology attachment) interface controller. More specifically, the controller may be an ATAPI (ATA packet interface) controller, and thus may be suited for use with devices such as CD-ROM drives, DVD-ROM drives, and tape drives. Interface controller 408 may provide the necessary logic for a parallel interface to one or more drives, such as floppy disk drives, hard disk drives, or the previously mentioned CD-ROM and DVD-ROM drives.

Control functions necessary for operating attached disk drive may be provided by interface controller 408. This may include sending read and write commands, sending interrupts, and querying for the status of a disk drive. In one embodiment, interface controller may support the sending of commands to 8-bit wide registers. Interface controller 408 may also provide a data path for read and write operations from each of the attached disk drives, which may be 16 bits wide in this embodiment.

As previously noted, interface controller 408 may support the connection of multiple disk drives (and may support the connection of tape drives in some embodiments). However, it may be required to prevent interface controller 408 from attempting to perform simultaneous transactions involving multiple drives in order to minimize the amount of necessary logic. Thus, device driver software used in conjunction with interface controller may be configured to not allow simultaneous transactions with multiple disk drives. For example, embodiments configured for use with a USB may be prevented from performing simultaneous transactions by the USB Mass Storage Class driver. The definition of this driver may prevent multiple disk drive transactions over the USB. Thus, only a single interface controller 408 may be needed in order to allow drive controller 400 to provide an interface for multiple drives. By configuring driver software to prevent simultaneous transactions to multiple drives that may be coupled to interface controller 408, the complexity of drive controller 400 may be kept at a minimum. In particular, the ability of the driver software to prevent simultaneous transactions to may allow the drive controller to be implemented with a single physical interface circuit 402, a single buffer 406, and a single interface controller 408. Thus, the complexity of drive controller 400 may be reduced to a level near that of a similar disk drive controller configured for supporting only one disk drive. Furthermore, the ability of drive controller 400 to support multiple disk drives (or tape drives in some embodiments) may eliminate the need for a USB hub. Elimination of the need for a USB hub may result in significant cost savings when it is necessary for a computer system to have the capability of supporting multiple drives.

Moving now to FIG. 5, a block diagram of one embodiment of a portable computer coupled to a docking station is shown. The portable computer and the docking station may each be configured for supporting multiple drives, as each may employ a drive controller 400.

Portable computer 300 includes processor 301, which may be coupled to bus bridge 302 and memory 303. Bus bridge 302 may provide an interface between processor 301 and USB controller 304. USB controller 304 may provide control functions for peripheral devices at multiple USB endpoints, and may conform to the USB 1.1 or USB 2.0 standard. In the embodiment shown, USB controller 304 is coupled to a drive controller 400 in docking station 320. Although not shown, USB controller 304 may be coupled to other USB endpoints in addition to drive controller 400. USB controller 304 may provide arbitration for each of the endpoints to which it is coupled. Arbitration may also be performed for multiple devices coupled to a USB endpoint. USB controller 304 may provide other functions as well, such as protocol conversions for data transmissions between the USB and bus bridge 302 and buffering for these data transmissions.

Portable computer 300 may include docking connector 315A, which may be complementary with docking connector 315B of docking station 320. The complementary connectors may allow portable computer 300 to be coupled to docking station 320. This may allow portable computer 300 to utilize extra functionality provided by docking station. As previously noted, USB controller 304 may be coupled to a drive controller 400 in docking station 320 when portable computer 300 is docked. This may allow portable computer 300 to utilize the functionality provided by drives 410 and 420. Each of drives 410 and 420 may be one of several different types of drives. These drives may include, but are not limited to, floppy disk drives, hard drives, CD-ROM drives, tape drives, optical drives, and ZIP drives.

It should be noted that, while various embodiments of the drive controller described herein have been done so with reference to portable computer systems and docking stations, embodiments of non-portable computer systems (e.g. desktop systems) employing the drive controller are also possible and contemplated.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A drive controller for controlling a plurality of disk drives, the drive controller comprising:
   a physical interface circuit, the physical interface circuit configured for coupling to a bus;
   a plurality of serial interface engines coupled to the physical interface circuit;
   a buffer coupled to each of the plurality of physical interface circuits; and
   an interface controller, wherein the interface controller is configured for coupling to the plurality of disk drives, and wherein the interface controller is further configured for controlling the operation of each of the plurality of disk drives.

2. The drive controller as recited in claim 1, wherein the bus is a universal serial bus (USB).

3. The drive controller as recited in claim 2, wherein the USB is coupled to a USB controller, wherein the USB controller supports the USB 2.0 standard.

4. The drive controller as recited in claim 2, wherein the USB controller supports the USB 1.1 standard.

5. The drive controller as recited in claim 1, wherein at least one of the plurality of disk drives is an advanced technology attachment (ATA) drive.

6. The drive controller as recited in claim 1, wherein at least one of the plurality of disk drives is an ATA packet interface (ATAPI) drive.

7. A computer system comprising:
   a bus controller;
   a peripheral bus coupled to the bus controller; and
   a drive controller coupled to the peripheral bus; wherein the drive controller includes:
      a physical interface circuit, the physical interface circuit coupled to the peripheral bus;
      a plurality of serial interface engines coupled to the physical interface circuit;
      a buffer coupled to each of the plurality of physical interface circuits; and
      an interface controller, wherein the interface controller is configured for coupling to a plurality of disk drives, and wherein the interface controller is further configured for controlling the operation of each of the plurality of disk drives.

8. The computer system as recited in claim 7, wherein the peripheral bus is a universal serial bus (USB).

9. The computer system as recited in claim 8, wherein the USB is coupled to the bus controller, wherein the bus controller is a USB controller configured to support the USB 2.0 standard.

10. The computer system as recited in claim 8, wherein the USB controller supports the USB 1.1 standard.

11. The computer system as recited in claim 7, wherein at least one of the plurality of drives is an advanced technology attachment (ATA) drive.

12. The computer system as recited in claim 7, wherein at least one of the plurality of drives is an ATA packet interface (ATAPI) drive.

13. A docking station comprising:
    a peripheral bus, wherein the peripheral bus is configured for coupling to a peripheral bus controller in a portable computer when the portable computer is coupled to the docking station; and
    a drive controller, the drive controller including:
       a physical interface circuit, the physical interface circuit coupled to the peripheral bus;
       a plurality of serial interface engines coupled to the physical interface circuit;
       a buffer coupled to each of the plurality of physical interface circuits; and
       an interface controller, wherein the interface controller is configured for coupling to a plurality of disk drives.

14. The docking station as recited in claim 13, wherein the peripheral bus is a universal serial bus (USB).

15. The docking station as recited in claim 14, wherein the peripheral bus controller is a USB controller, and wherein the USB controller supports the USB 2.0 standard.

16. The docking station as recited in claim 14, wherein the USB controller supports the USB 1.1 standard.

17. The docking station as recited in claim 13, wherein at least one of the plurality of disk drives is an advanced technology attachment (ATA) drive.

18. The docking station as recited in claim 13, wherein at least one of the plurality of disk drives is an ATA packet interface (ATAPI) drive.

* * * * *